US012689015B2

(12) United States Patent
Booy et al.

(10) Patent No.: US 12,689,015 B2
(45) Date of Patent: Jul. 21, 2026

(54) PLANAR ION PROCESSING STATION

(71) Applicant: DH Technologies Development Pte. Ltd., Singapore (SG)

(72) Inventors: Aaron Timothy Booy, Concord (CA); James Hager, Concord (CA)

(73) Assignee: DH Technologies Development Pte. Ltd., Singapore (SG)

( * ) Notice: Subject to any disclaimer, the term of this patent is extended or adjusted under 35 U.S.C. 154(b) by 349 days.

(21) Appl. No.: 18/285,715

(22) PCT Filed: Apr. 4, 2022

(86) PCT No.: PCT/IB2022/053126
§ 371 (c)(1),
(2) Date: Oct. 5, 2023

(87) PCT Pub. No.: WO2022/214943
PCT Pub. Date: Oct. 13, 2022

(65) Prior Publication Data

US 2024/0203719 A1 Jun. 20, 2024

Related U.S. Application Data

(60) Provisional application No. 63/171,403, filed on Apr. 6, 2021.

(51) Int. Cl.
*H01J 49/06* (2006.01)

(52) U.S. Cl.
CPC .......... *H01J 49/066* (2013.01); *H01J 49/061* (2013.01)

(58) Field of Classification Search
CPC .............................. H01J 49/066; H01J 49/061
See application file for complete search history.

(56) References Cited

U.S. PATENT DOCUMENTS 10,804,089 B2 10/2020 Ibrahim et al.
2016/0071715 A1 3/2016 Anderson et al.
2019/0103261 A1* 4/2019 Ibrahim ................ H01J 49/062

OTHER PUBLICATIONS

International Invitation to Pay Additional fees and Partial Search Report, PCT/IB2022/053126, dated Jun. 30, 2022, 15 pages.
International Search Report and Written Opinion, PCT/IB2022/053126, dated Aug. 23, 2022, 21 pages.
Liulin Deng et al: "Serpentine Ultralong Path with Extended Routing (SUPER) High Resolution Traveling Wave Ion Mobility-MS using Structures for Lossless Ion Manipulations", Analytical Chemistry, vol. 89, No. 8, Mar. 23, 2017 (Mar. 23, 2017) , pp. 4628-4634.

* cited by examiner

*Primary Examiner* — Nicole M Ippolito
(74) *Attorney, Agent, or Firm* — Potomac Law Group, PLLC; Reza Mollaaghababa; Brian Hairston

(57) ABSTRACT

In one aspect, an ion guide for use in a mass spectrometer is disclosed, which comprises a pair of printed circuit boards (PCBs) having an inlet for receiving a plurality of ions from an upstream ion source and outlet through which the ions exit the ion guide. The ion guide includes at least two ion paths provided in the space between the two PCBs for transmission of ions from the inlet to the outlet. The ion guide can further include at least one ion-routing device that can be coupled to the ions paths for selecting a propagation path of the ions between those ion paths. In some embodiments, the two ion paths can have at least one segment in common.

14 Claims, 19 Drawing Sheets

PLANAR ION PROCESSING STATION

RELATED APPLICATIONS

This application is a 35 U.S.C. § 371 national stage filing of International Application No. PCT/IB2022/053126, filed on Apr. 4, 2022, which claims priority to U.S. Provisional Application No. 63/171,403 filed on Apr. 6, 2021, the contents of both of which are incorporated herein in their entirety.

BACKGROUND

The present disclosure is generally directed to mass spectrometers as well as methods for performing mass spectrometry, e.g., mass spectrometers that employ flat surfaces of printed circuit boards (PCBs) on which electrodes are deposited for processing ions, e.g., for guiding, fragmenting and analyzing ions.

Mass spectrometry (MS) is an analytical technique for determining the structure of test chemical substances with both qualitative and quantitative applications. MS can be useful for identifying unknown compounds, determining the composition of atomic elements in a molecule, determining the structure of a compound by observing its fragmentation, and quantifying the amount of a particular chemical compound in a mixed sample. Mass spectrometers detect chemical entities as ions such that a conversion of the analytes to charged ions must occur during the sampling process.

Mass spectrometers can include multiple stages, for example, for focusing ions, filtering ions, fragmenting ions, and providing mass analysis of ions. The implementation and maintenance of such conventional mass spectrometers can be complex and expensive.

Although attempts have been made for fabricating low-cost mass spectrometers, a number of challenges still remain in reducing the fabrication and maintenance costs of mass spectrometers.

SUMMARY

In various aspects, a low-cost mass spectrometer with a small footprint is provided. In one aspect, an ion guide for use in a mass spectrometer is disclosed, which comprises two printed circuit boards (PCBs) positioned relative to one another such that two surfaces of the PCBs are opposed relative to one another and are separated by a gap providing an ion transmission passageway between the two surfaces, where the passageway comprises an inlet for receiving ions and an outlet through which ions exit the passageway. A plurality of ion guiding electrodes is disposed on the surfaces of the PCBs to which RF and/or DC voltages can be applied for guiding the ions from the inlet to the outlet. The plurality of the electrodes is arranged on those surfaces so as to provide at least two ion paths for transmission of the ions from the inlet to the outlet. At least one ion-routing device operably coupled to the ion paths can establish a propagation path for the ions received from the inlet to the outlet along the first or the second ion path. In other words, the ion-routing device can select one ion path or the other for transmission of the ions from the inlet to the outlet. In some embodiments, the ion-routing device can be operably coupled to a junction at which the two ion paths diverge to control the passage of ions through one path or the other.

In some embodiments, the ion-routing device comprises a plurality of ion-routing electrodes disposed on the surfaces of the PCBs to which RF and/or DC voltages can be applied for diverting the ions from one of said ion paths to the other ion path, and vice versa.

In some embodiments, the ion-routing device comprises a plurality of electrically conductive posts disposed between the opposed surfaces of the PCBs to which RF and/or DC voltages can be applied for diverting the ions from one of said ion paths to the other ion path. In some such embodiments, the posts can also provide structural support for maintaining the separation between the two PCBs.

In some embodiments, the ion guide can further include a controller in communication with the ion-routing device for applying one or more control signals to the ion-routing device for instructing the ion-routing device to select one of the available ion paths for transmission of the ions from the inlet to the outlet.

In some embodiments, at least two of the ion paths have at least one segment in common. By way of example, in some such embodiments, such a common segment can be a proximal segment receiving ions from the ion guide's inlet and/or a distal segment of the ion guide through which ions exit the ion guide.

In a related aspect, an ion guide for use in a mass spectrometer is disclosed, which comprises at least two ion paths extending from an inlet to an outlet, where the two ion paths have a common proximal segment for receiving ions from the inlet and a common distal segment through which the ions exit through the outlet, and an ion-routing device operably coupled to the ion paths for establishing a propagation path of the ions along the first or the second ion path from the inlet to the outlet. In some embodiments, the first and the second ion propagation paths are disposed between two substantially flat surfaces. In some embodiments, the substantially flat surfaces are inner surfaces of the two PCBs.

In some embodiments, a plurality of ion-guiding conductive electrodes is disposed on said two surfaces and configured for application of RF and/or DC voltages thereto for guiding the ions along said first and second ion paths. In some embodiments, each conductive electrode on each of the surfaces is in substantial register with a conductive electrode on the opposed surface so as to provide one or more pairs of opposed conductive electrodes, where across each pair of the opposed conductive electrodes one or more RF and/or a DC voltages can be applied.

In some embodiments, a controller can apply one or more control signals to the ion-routing device for selecting the first or the second ion path for propagation of the ions from the inlet to the outlet. In some embodiments, the ion-routing device includes a plurality of conductive segments that are disposed on the two opposed surfaces of the PCBs and are configured for application of one or more RF and/or DC voltages thereto for distributing the ions between the ion paths.

In some embodiments, the ion-routing device generates a quadrupolar field for guiding the ions from one ion path to another. In some such embodiments, the ion guide can include a plurality of conductive posts disposed between the two PCBs to which DC voltages can be applied so as to generate a DC quadrupolar field at a junction between two ion paths so as to direct the ions along one path or the other. In some such embodiments, the posts can also function as structural elements for supporting the positioning of the PCBs relative to one another.

In some embodiments, one or more RF and/or DC voltage sources can be employed to apply the requisite RF and/or DC voltages to the conductive electrodes deposited on the surfaces of the PCBs. A controller in communication with the RF and/or DC voltage sources can control the voltage sources for application of appropriate RF and/or DC voltages to the conductive electrodes.

In a related aspect, a mass spectrometer is disclosed, which comprises two printed circuit boards (PCBs) positioned at a distance relative to one another so as to provide a passageway therebetween extending from an inlet through which ions can enter the passageway to an outlet through which ions can exit the passageway. An ion guide positioned in proximity of the inlet includes a first plurality of conductive electrodes disposed on first opposed portions of the two surfaces such that each electrode on one surface is pairwise associated with an electrode on the opposed surface, where at least an RF voltage can be applied across at least one opposed electrode pair of said plurality of conductive electrodes for generating an electromagnetic field for providing radial focusing of the ions passing through the ion guide.

A mass filter is disposed downstream of the ion guide, where the mass filter comprises a second plurality of conductive electrodes disposed on second opposed portions of the two surfaces such that each electrode on one surface is pairwise associated with an electrode on the opposed surface, where application of at least one RF voltage and at least one DC resolving voltage to one or more of said electrodes generates an electromagnetic field that provides radial confinement of the ions and allows passage of ions within a desired target range of m/z ratios while inhibiting passage of ions having m/z ratios outside said target range. An ion fragmentation and cooling segment is positioned downstream of the mass filter, said ion fragmentation and cooling segment comprising a third plurality of conductive electrodes disposed on third opposed portions of said two surfaces such that each electrode on one surface is pairwise associated with an electrode on the opposed surface, where the application of at least one RF voltage across at least one pair of said third plurality of electrodes generates an electromagnetic field for providing radial confinement of the ions as the ions pass through the fragmentation and cooling segment. A mass analyzer is positioned downstream of the ion fragmentation and cooling segment. The mass analyzer includes a fourth plurality of electrodes disposed on fourth opposed portions of said two surfaces such that each electrode on one surface is pairwise associated with an electrode on the opposed surface, where the electrodes are configured for application of RF and/or DC voltages thereto for detecting ions having a target m/z ratio.

In some embodiments, the mass analyzer is configured to function as a Fourier Transform (FT) mass analyzer.

In some embodiments, each of the first, second, third and fourth plurality of electrodes is configured to generate an approximately quadrupolar electromagnetic field upon application of one or more RF voltages thereto.

In some embodiments, each of the electrodes is in the form of a conductive strip that is deposited on one of the surfaces of the PCBs. In some such embodiments, each of the conductive strips can have a width in a range of about 0.02 to about 2 cm. Further, in some such embodiments, each of the conductive strips can have a thickness in a range of about 10 micrometers to about 100 micrometers.

In some embodiments, the two PCBs are substantially parallel relative to one another.

The conductive strips can include at least one metal layer. In some embodiments, a conductive strip can include a plurality of metal layers. By way of example, a conductive strip can be formed as a stack of two or more different metal layers. By way of example, one metal layer can be a copper layer and another metal layer can be formed of ENIG or hard gold, In some embodiments, the space between the PCBs can be enclosed, e.g., via a plurality of lateral walls, to provide an enclosure, which can be evacuated to a desired pressure, for example, a pressure in a range of about 0.01 to about 10 mTorr.

In a related aspect, an ion guide for use in a mass spectrometer is disclosed, which comprises an inlet for receiving a plurality of ions from an upstream ion source and an outlet through which ions can exit the ion guide, and at least two ion paths extending from the inlet to the outlet, where the two ion paths have a common proximal segment for receiving ions from the inlet and a common distal segment through which the ions exit through the outlet. An ion-routing device can be coupled to the ion paths for establishing a propagation path of the received ions along said first or said second ion path from said inlet to said outlet.

In some embodiments, a controller is provided for applying one or more control signals to the ion-routing device for selecting said first or said second ion path for propagation of the ions from the inlet to the outlet.

Further understanding of various aspects of the present teachings can be obtained by reference to the following detailed description in conjunction with the associated drawings, which are described briefly below.

DETAILED DESCRIPTION

The present teachings are generally directed to a mass spectrometer that is fabricated as an integrated unit using at least two printed circuit boards as well as multi-path ion guides. As discussed in more detail below, a plurality of conductive electrodes can be deposited on the inner surfaces of the PCBs and RF and/or DC voltages can be applied to these conductive electrodes for generating electromagnetic fields within the space between the two PCBs for guiding the ions and/or performing mass analysis thereof.

Various terms are used herein according to their ordinary meanings. The term "printed circuit board" and its abbreviation "PCB," as used herein, refers to a component containing conductive tracks, pads and other features etched from, printed on, or deposited on one or more sheet layers of material laminated onto and/or between sheet layers of a non-conductive substrate. As discussed in more detail below, in many embodiments, a double-sided PCB is employed that lacks multiple laminations in order to mitigate outgassing when the PCB is positioned in an evacuated chamber. The term "about" as used herein is intended to indicate a variation of at most 10% around a numerical value.

Figure 1A:
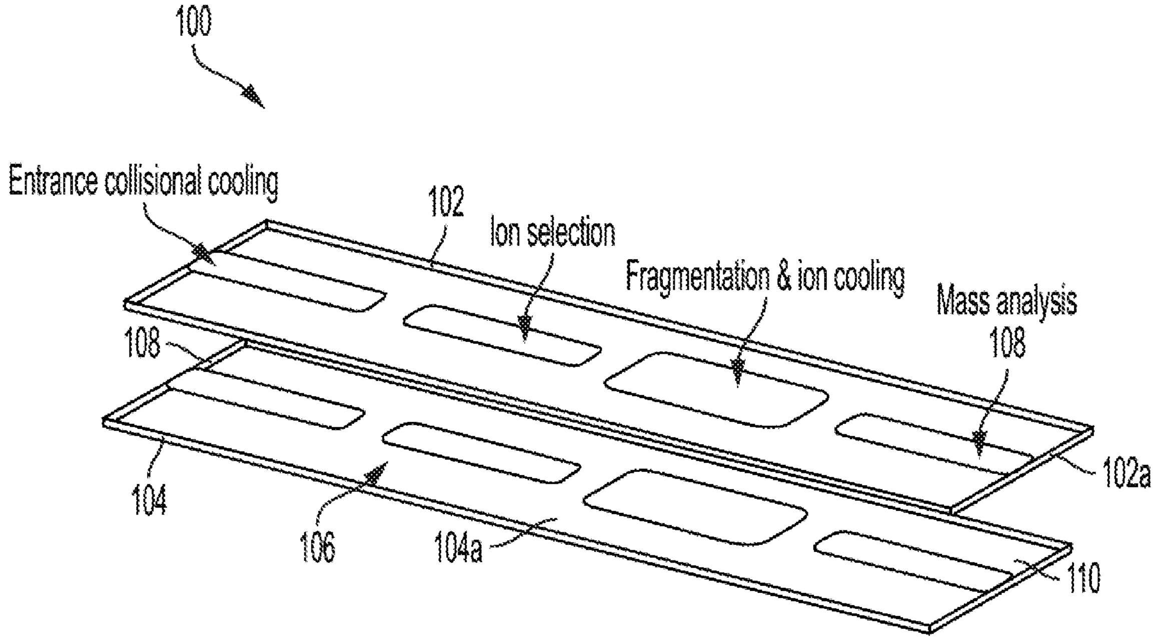
FIG. 1A schematically depicts a perspective view of an integrated mass spectrometer formed by using two opposed PCBs in accordance with an embodiment of the present teachings.
Figure 1B:
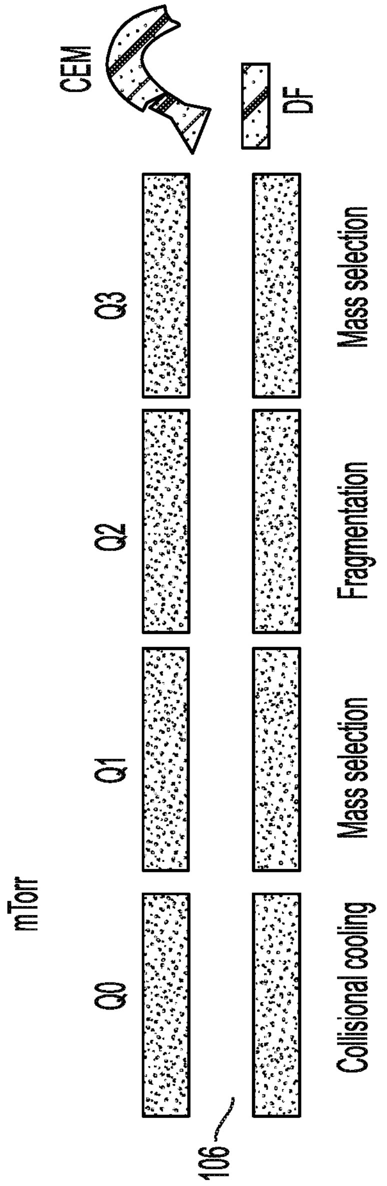
FIG. 1B is a schematic side view of the integrated mass spectrometer shown in FIG. 1A.

With respect to FIGS. 1A and 1B, a mass spectrometer 100 according to an embodiment of the present teachings includes at least two printed circuit boards (PCBs) to which various stages of the mass spectrometer are mounted. In other words, the mass spectrometer 100 provides an integrated mass spectrometric system that is implemented using at least a pair of PCBs.

More specifically, the mass spectrometer 100 includes two printed circuit boards 102 and 104 that are positioned relative to one another such that a gap is formed between their opposed internal (inner) surfaces 102*a* and 104*a*, which provides a passageway 106 extending from an inlet 108 for receiving ions from an upstream ion source (not shown in this figure) to an outlet 110 through which ions can exit the passageway. In this embodiment, the two PCBs are positioned relative to one another such that their inner surfaces 102*a* and 104*a* are substantially parallel to one another.

With continued reference to FIGS. 1A and 1B, the mass spectrometer 100 includes multiple stages Q0, Q1, Q2, and Q3, where Q0 functions as an ion guide for providing collisional cooling and radial focusing of the received ions, Q1 functions as a mass filter for selecting ions having m/z ratios within a target range, Q2 functions as a collision cell for providing fragmentation/cooling of the ions passing through it, and Q3 functions as a mass analyzer for detecting target ion(s) of interest.

FIGS. 2A, 2B, 2C, 3, 4 schematically depict an implementation of the integrated mass spectrometer 100 according to the present teachings, which includes two opposed PCBs 102 and 104 on which electrodes for implementing the functional stages Q0, Q1, and Q3 are disposed. As discussed in more detail below, in this embodiment, the functional stage Q2, which provides a collision cell, is implemented separately by using two smaller opposed PCBs on inner surfaces of which conductive electrodes are deposited. The separate Q2 is sandwiched between the PCBs 102 and 104 and is flanked on one side by Q1 and on the other side by Q3.

In this embodiment, the Q0 ion guide includes ten electrodes, five of which (i.e., electrodes 112*a*, 112*b*, 112*c*, 112*d*, and 112*e*, which are herein collectively referred to as electrodes 112) are disposed on the inner surface of the PCB 102 and the other five electrodes (i.e., electrodes 113*a*, 113*b*, 113*c*, 113*d*, and 113*e*) are disposed on an inner surface of the PCB 104 such that the upper and the lower electrodes are pairwise associated with one another, where across each electrode pair a DC and/or an RF voltage can be applied, as discussed in more detail below.

Figure 9A:
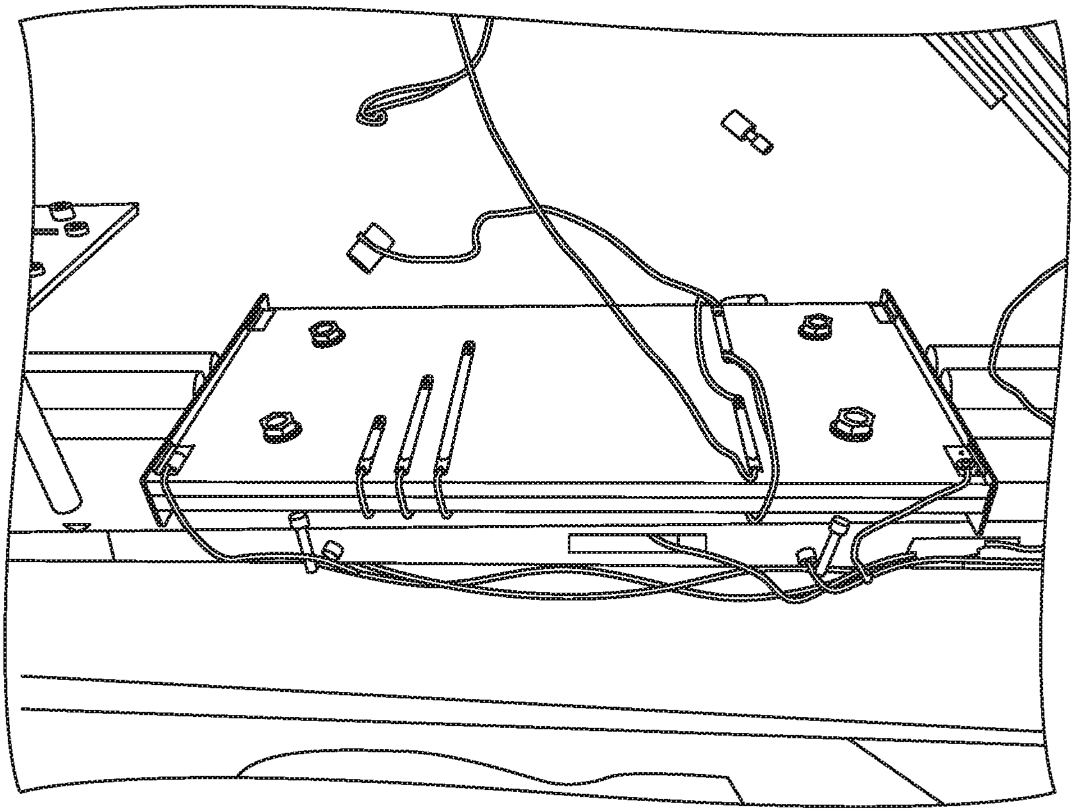
FIG. 9A is a representation of a fabricated prototype ion guide in accordance with one embodiment.
Figure 9B:
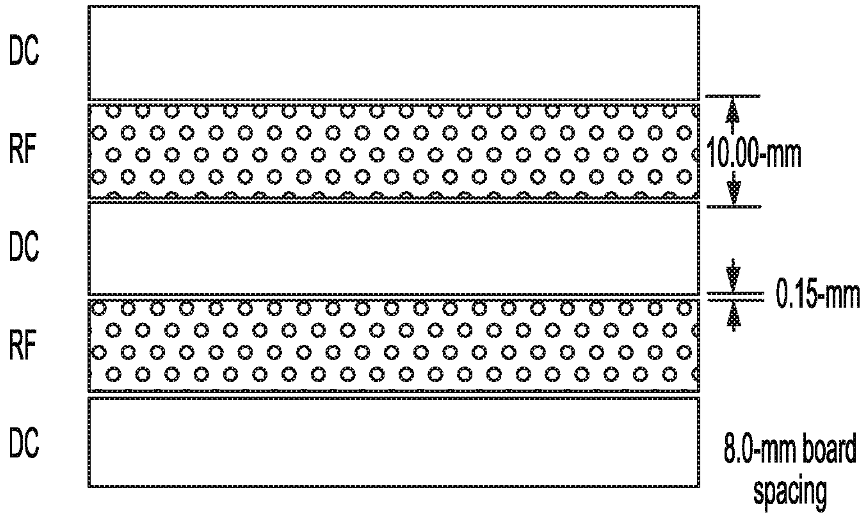
FIG. 9B shows certain dimensions of electrodes and spacing between them utilized in fabricating the prototype ion guide illustrated in FIG. 9A as well as the pattern of RF and DC voltages applied to those electrodes.

A variety of patterns of DC and/or RF voltages can be applied across the electrodes of the Q0 stage (as well as other downstream stages of the integrated mass spectrometer). Some examples of such patterns of applied RF and/or DC voltages are depicted in FIGS. 9A, 9B, 9C, 9D, 9E, and 9F. For example, in this embodiment, an RF voltage source 114 can apply an RF voltage across each of the electrode pairs 112*b*/113*b*, 112*c*/113*c* so as to generate a multipole electromagnetic field within the portion of the passageway corresponding to the Q0 stage such that the electromagnetic field would provide radial confinement and focusing of the ions. The RF voltages applied to the electrodes 112*b*/113*b*, 112*c*/113*c* have the same amplitudes but the phases of the voltages applied to adjacent electrodes are opposite to one another, as shown in FIG. 9B in connection with the description of a prototype mass spectrometer.

The application of such RF voltages to these electrodes can result in the generation of approximately quadrupolar field within the passageway, which can provide radial confinement of the ions passing through the passageway. In other embodiments, RF voltages to selected ones of the electrodes to generate other multipole electromagnetic fields.

By way of example, in some embodiments, the RF voltages applied to the Q0 electrodes can have a frequency in a range of about 0.3 MHz to about 3 MHz and an amplitude (zero-to-peak amplitude) in a range of about 50 volts to about 500 volts.

Further, a DC voltage source 115 applies DC voltages across each of the electrode pairs 112*a*/113*a*, 112*c*/113*c*, and 112*e*/113*e* to provide lateral confinement of the ions as they pass through the Q0 stage. In some embodiments, a DC voltage applied across each of these electrode pairs can have an amplitude in a range of about −100 volts to about 100 volts. While in some embodiments the DC voltages applied to the electrodes pairs have the same amplitude, in other embodiments they can have different amplitudes.

Figure 2A:
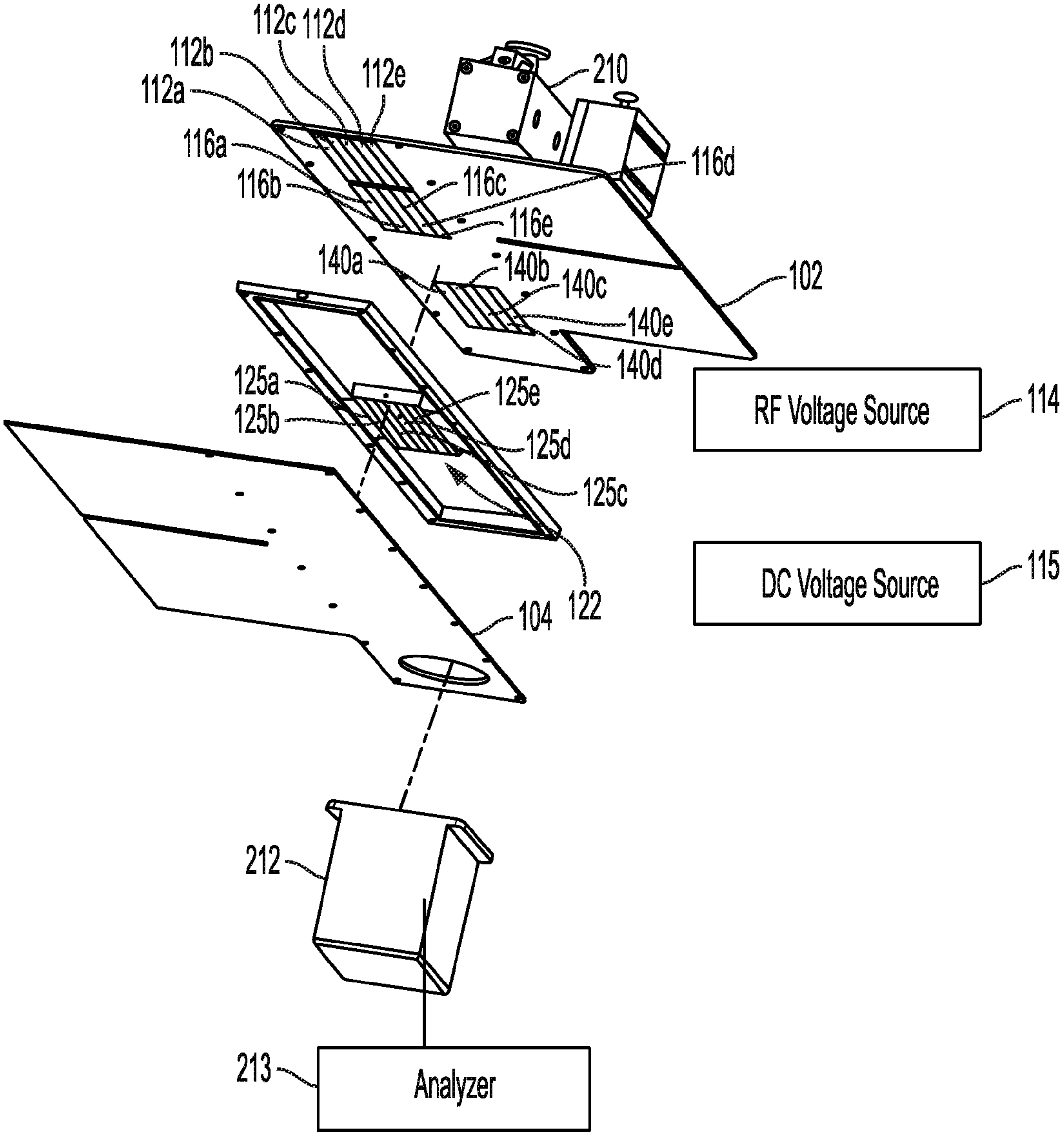
FIG. 2A is an exploded view of an integrated mass spectrometer according to an embodiment of the present teachings.
Figure 2B:
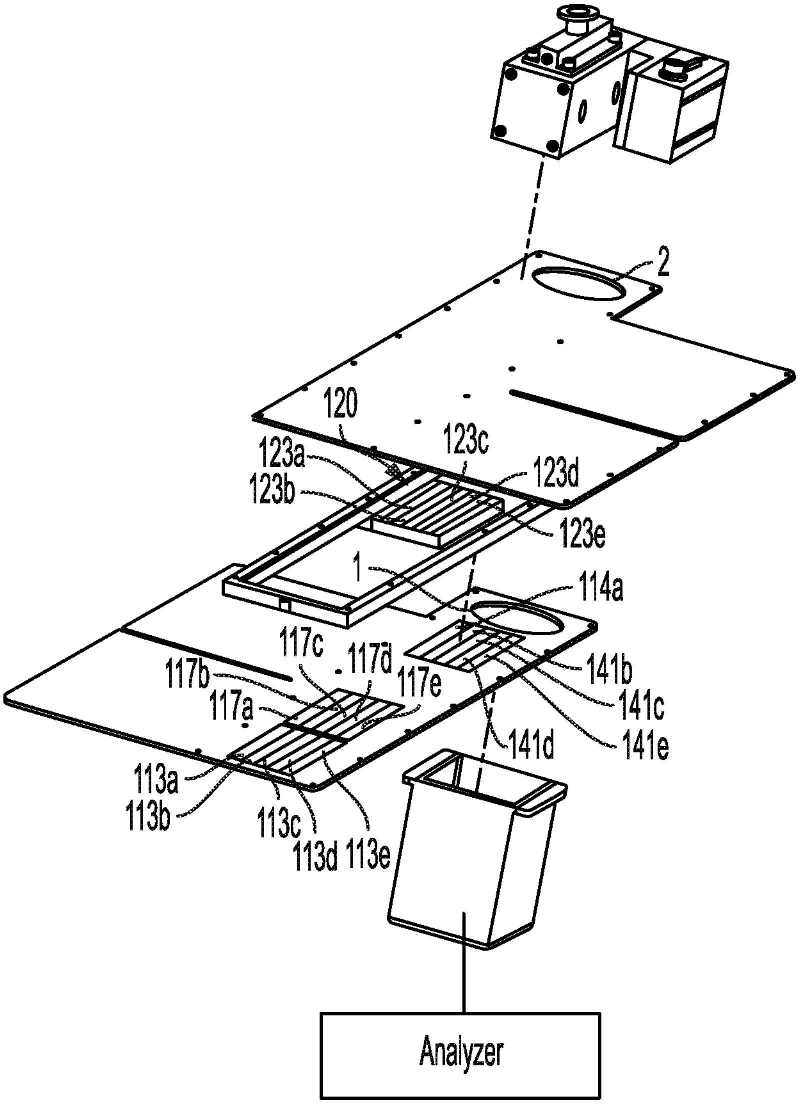
FIG. 2B is another exploded view of the integrated mass spectrometer depicted in FIG. 2A.

With particular reference to FIGS. 2A and 2B, similar to the Q0 stage, the Q1 mass filter stage can be implemented by depositing a plurality of electrodes on opposed portions of the inner surfaces 102*a*/104*a* of the PCBs. More specifically, in this embodiment, five electrodes 116*a*, 116*b*, 116*c*, 116*d*, and 116*e* (herein collectively referred to as electrodes 116) are deposited on a portion of the inner surface of the upper PCB 102 and five electrodes 117*a*, 117*b*, 117*c*, 117*d*, and 117*e* (herein collectively referred to as electrodes 117) are deposited on an opposed portion of the inner surface of the lower PCB 104 so as to be pairwise associated with one another.

Similar to the Q0 stage, the RF voltage source 114 applies RF voltages across each pair of the two electrode pairs 116*b*/117*b* and 116*d*/1176*d* so as to generate a quadrupolar electromagnetic field within the passageway portion associated with the Q1 mass filter such that the electromagnetic field can provide radial confinement of the ions. In addition, the DC voltage source 115 (or another DC voltage source) can apply resolving DC voltages to the electrodes of the electrode pairs 116*b*/117*b* and 116*d*/117*d* in +/− polarities for selecting an m/z ratio of interest or a range of m/z ratios of interest for passage to the downstream Q2 stage. As discussed in more detail below, in some embodiments, at least a portion of the ions received by the Q2 stage undergo fragmentation to generate a plurality of product ions that are received by the Q3 mass analysis stage. Similar to the Q0 stage, the RF voltages applied to the electrodes of the Q2 stage can have an amplitude in a range of about 50 volts to about 500 volts and a frequency in a range of about 0.3 MHz to about 3 MHz.

Figure 3:
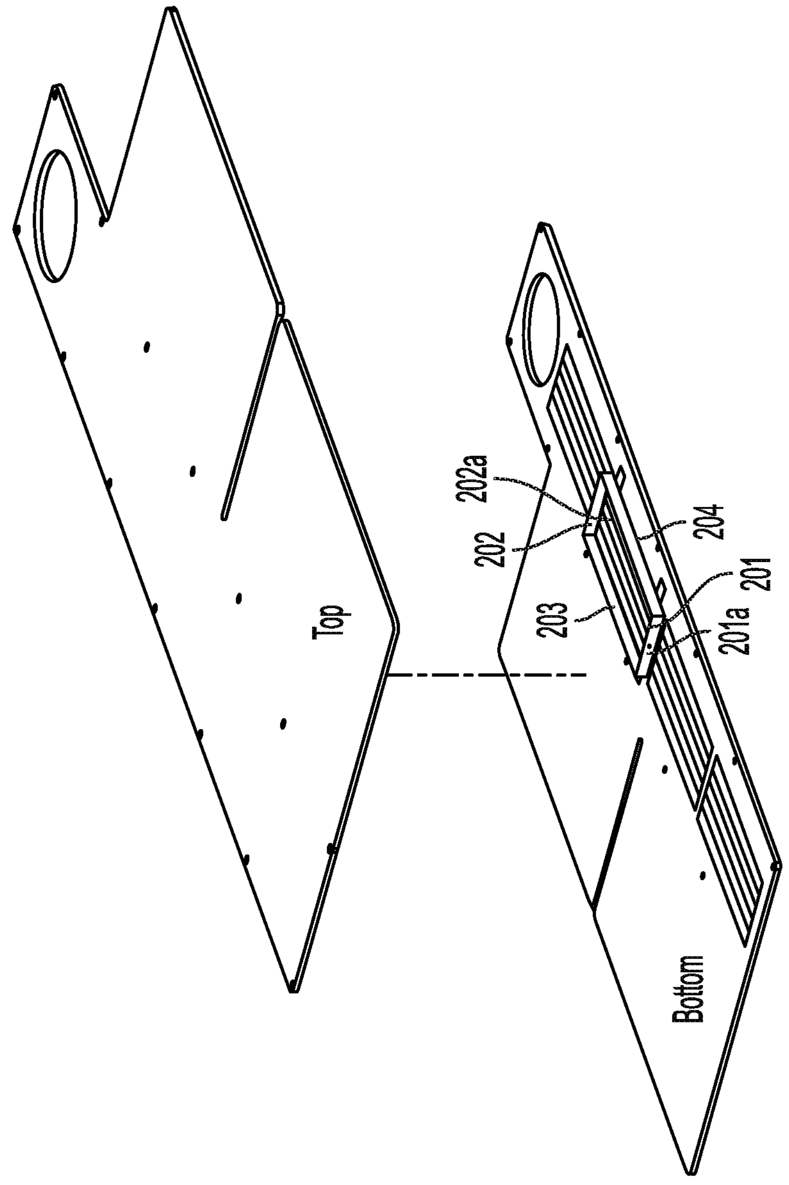
FIG. 3 is a partial schematic view of the integrated mass spectrometer depicted in FIGS. 2A and 2B, further illustrating a plurality of lower conductive electrodes employed for forming the Q0, Q1, Q2, and Q3 stages.
Figure 4:
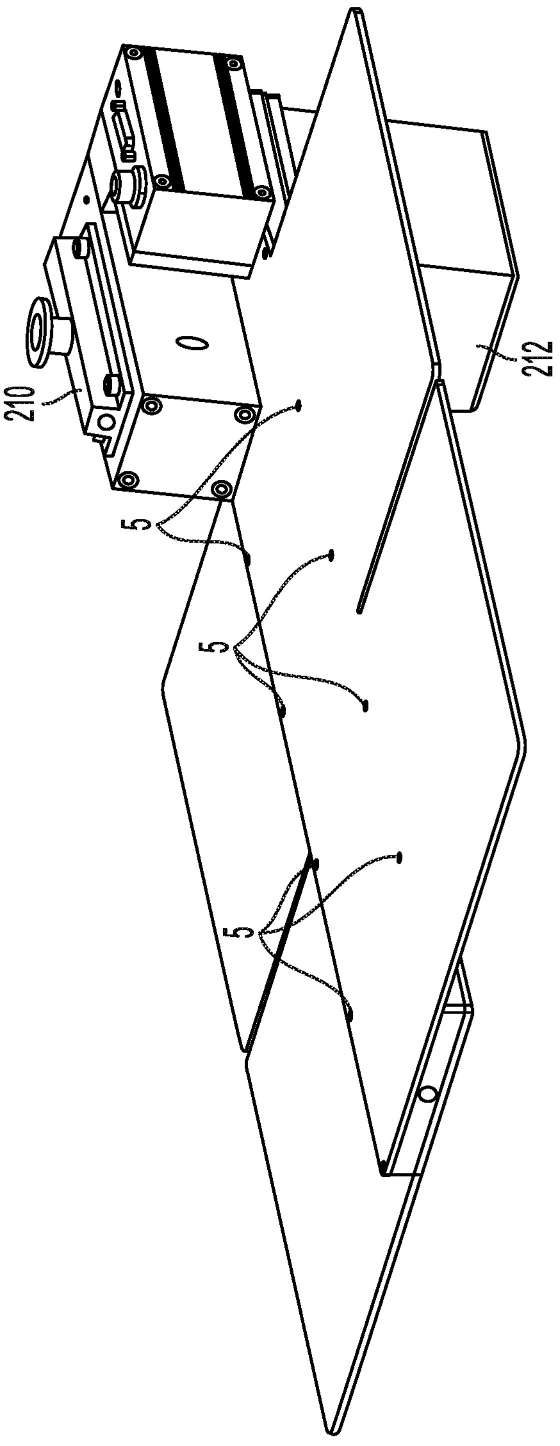
FIG. 4 is a schematic view of the integrated mass spectrometer depicted in FIGS. 2A and 2B in an assembled state, FIG. 5A schematically depicts two opposed PCBs of an ion guide according to an embodiment of the present teachings

With particular reference to FIG. 3, in this embodiment, the Q2 stage is implemented as a separate unit and is disposed between the top and bottom PCBs 102 and 104. More specifically, in this embodiment, the Q2 stage includes two opposed PCB's 120 and 122 on each of which five electrodes are deposited such that the electrodes are pairwise associated with one another, similar to the electrodes discussed above in connection with the Q0 and Q1 stages. More specifically, five electrodes 123*a*, 123*b*, 123*c*, 123*d*, 123*e* (herein collectively referred to as electrodes 123) are disposed on an inner surface of the upper PCB 120 and five electrodes 125*a*, 125*b*, 125*c*, 125*d*, and 125*e* (herein collectively referred to as electrodes 125) are disposed on an inner surface of the lower PCB 122. RF voltages can be applied across each of the electrode pairs 123*b*/125*b* and 123*d*/123*d*, using for example an RF voltage source (not shown in the figures), to generate a quadrupolar electromagnetic field for radial confinement of the ions. Further, DC voltages can be applied across each pair of the DC guard electrodes to provide lateral confinement of the ions.

In this embodiment, the Q2 stage is circumferentially enclosed within four walls 201, 202, 203, and 204, to configure the Q2 stage as a collision cell in which the background pressure can be increased to a level suitable for facilitating ion fragmentation. The front and back walls 201 and 202 include opening 201*a* and 202*a* through which ions can be introduced into the collision cell and product ions generated via fragmentation of at least a portion of a plurality of precursor ions (as well as any remaining precursor ions) can exit the collision cell, respectively. These circumferential walls together with the top and bottom PCBs forming the Q2 stage form an enclosed volume in which ion fragmentation can be achieved. As noted above, the Q2 stage is sandwiched between the 102/104 PCBs.

In some embodiments, the Q2 stage can be configured to provide an axial electric field for increasing the ion energies as they pass through the Q2 stage in order to facilitate their passage and/or fragmentation. In some embodiments, an axial driving force can be provided to allow the increased passage of the ions could be achieved using, for example, wedge shaped printed traces formed on DC portion of the Q2 PCBs.

The product ions generated in the Q2 stage are received by the Q3 stage, which functions as a mass analyzer to generate a mass spectrum of the received product ions. Similar to the upstream stages, in this embodiment, the Q23 stage is implemented as a plurality of conductive electrodes deposited on the opposed surfaces 102*a*/104*a* of the PCB's 102/104.

Referring again to FIGS. 2A and 2B, in this embodiment, the Q3 stage includes five electrodes 140*a*, 140*b*, 140*c*, 140*d*, and 140*e* (herein referred to as electrodes 140) disposed on the inner surface of the upper PCB 102 and another set of opposed five electrodes 141*a*, 141*b*, 141*c*, 141*d*, and 141*e* (herein referred to as electrodes 141) disposed on the inner surface of the lower PCB 104 such that the electrodes 140 and 141 are pairwise associated with one another. In this embodiment, RF voltages are applied to each of the electrode pairs 140*b*/141*b* and 140*d*/141*d* to generate a quadrupolar electromagnetic field within the Q3 stage and DC voltages are applied across each of the pairs of DC guard electrodes 140*a*/141*a*, 140*c*/141*c*, and 140*e*/141*e* to provide lateral confinement of the ions.

Further, in addition to the RF voltage, DC resolving voltages can be applied to Q1 and Q3 conductive RF/DC traces in a manner known in the art to configure Q1 and/or Q2 as a mass filter. The application of DC voltages to the electrodes on the outsides of the RF/DC traces to provide a confining field.

In some such embodiments, the RF and DC voltages applied to the electrodes 122 can be swept to change the m/z ratio to be detected by the Q3 mass analyzer. The ions passing through the mass analyzer Q3 are detected by a detector 212, via passage through openings 10 and 11 formed in the upper and the lower PCBs 102/104, which can generate ion detection signals in response to the detection of the incident ions. An analyzer 213 that is in communication with the ion detector 212 can receive the ion detection signals and process those signals in a manner known in the art to produce a mass spectrum of the product ions. The analyzer can be implemented in hardware, firmware, and/or software in a manner known in the art as informed by the present teachings. It should be understood that in some embodiments, the RF and DC voltages applied to the electrodes of the Q1 stage can also be swept to change the m/z ratio of ions passing through the Q1, though with a low resolution (i.e., the m/z ratios will not be selected with a high resolution and hence the mass peak associated with the ions passing through the Q1 will be wide).

In this manner, a mass spectrum of the product ions formed in the Q2 stage via fragmentation of the precursor ions selected by the mass filter Q1 can be generated.

In some embodiments, the Q3 stage can be implemented as a rectilinear ion trap. In this case the RF and DC voltages can be applied in the same fashion. The DC barriers can be applied by biasing the inter-quadrupole lenses, IQ1 and IQ2 appropriately. Such lenses IQ1 and IQ2 can be implemented in a variety of ways using techniques known in the art as informed by the present teachings. For example, such a lens can be implemented as a bent piece of metal having an orifice through which ions can pass.

In this embodiment, the electrodes of each of the stages Q0, Q1, Q2, and Q3 can be in the form of a conductive strip to which RF (and/or DC) voltages can be applied. By way of example, the electrodes can have a width in a range of about 2 mm to about 20 mm and a length in a range of about 50 mm to about 250 mm, though other dimensions may also be employed.

Further, in some embodiments, the electrodes can have a thickness in a range of about 10 micrometers to about 100 micrometers, though other thicknesses may also be employed. In some embodiments, the electrodes can be formed as a single metal layer, whereas in other embodiments, the electrodes can be formed as stacked layers of two or more metals. Some examples of suitable metals include, without limitation, copper and ENIG, gold. By way of example, in some such embodiments, one or more of the electrodes can include a copper layer that is deposited on a surface of the PCB and a gold layer that is deposited over the copper layer. By way of example, in such an embodiment, the thickness of the copper layer can be in a range of about 10 micrometers to about 100 micrometers and thickness of the gold layer can be less than 10 micrometers, e.g., in a range of about 1 micrometer to about 5 micrometers, though other thicknesses can also be employed.

In this embodiment, the Q3 mass analyzer can be configured to function as a Fourier Transform (FT) mass analyzer. As discussed in more detail below, an FT mass analyzer exhibits good performance when the ion energy is of the order of about 0.2 to about 1.0 eV. It has been found that an FT mass analyzer can produce usable mass spectra up to an operating pressure of about 2 milliTorr. However, it is difficult to achieve good ion fragmentation and subsequent thermalization of the product ions and the residual precursor ions to appropriate ion energies at such operating pressures using standard-length ion optics (e.g., ion guides having 8-inch long quadrupole rods).

Figure 2C:
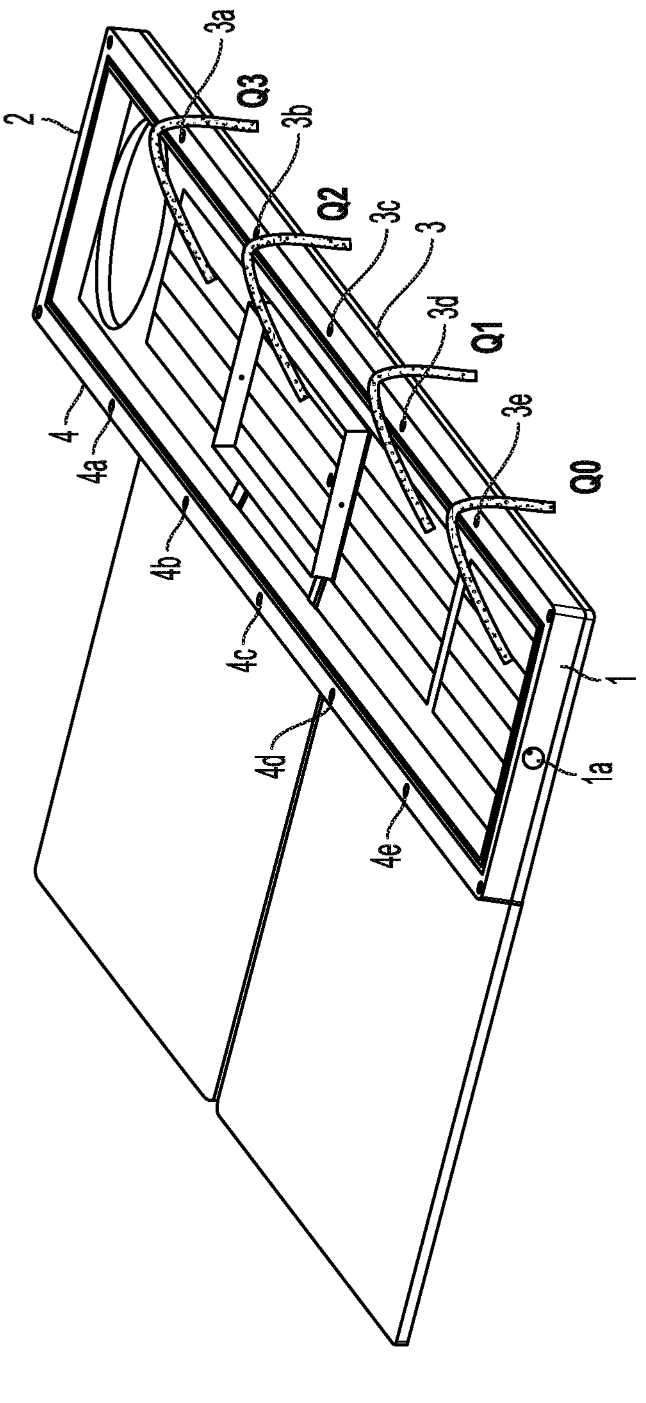
FIG. 2C is a schematic view of the integrated mass spectrometer shown in FIGS. 2A and 2B with the top PCB removed.

As shown in FIG. 2C, in this embodiment, the integrated mass spectrometer 100 is circumferentially enclosed within a frame including a front wall 1, a back wall 2, and two lateral walls 3 and 4, where the front wall 1 includes an opening 1*a* through which ions can enter the Q0 stage of the mass spectrometer. In some embodiments, the front wall 1 can function as an electrode to facilitate the introduction of the ions into the Q0 stage. The latter walls can include a plurality of openings (such as openings 3*a*, 3*b*, 3*c*, 3*d*, and 3*e* as well as openings 4*a*, 4*b*, 4*c*, 4*d*, and 4*e*) that can be placed in register with a plurality of openings provided on the upper PCB 102 (See, e.g., openings 5). A plurality of fasteners (not shown in the figure) can pass through the openings provided in the PCB 102 and the respective ones in the lateral walls of 3 and 4 to couple to the PCB 102 to the frame.

In some embodiments, the mass spectrometer 100 can be maintained at a background pressure, e.g., in a range of about 1 to about 2 milliTorr. For example, in this embodiment, a turbo pump 210 (See, e.g., FIG. 4) can apply a negative pressure to the interior of the mass spectrometer to reduce the pressure into a desired range.

In some cases, a background pressure in a range of about 1 to about 2 milliTorr may not be sufficient to provide efficient collisional fragmentation of the ions. In such cases, an axial DC electric field may be needed in order to increase the axial kinetic energy of the ions, thereby facilitating their fragmentation.

In some embodiments of the present teachings, the ion path length between the fragmentation region and the FT mass analyzer can be increased, rather than, or in addition to, increasing the pressure in the fragmentation region, to achieve better fragmentation and thermalization. Such an approach is particularly advantageous in a mass spectrometer according to the present teachings formed between two PCBs in which various stages of the mass spectrometer can be maintained at a substantially similar background pressure.

For example, in some embodiments, one or more ion guides that can provide alternative ions paths, some of which are longer than others, can be employed. Another aspect of the present teachings relates to certain embodiments of such ion guides, which can include a pair of spaced-apart PCBs and a plurality of electrodes disposed on opposed inner surfaces of the PCBs to which RF and/or DC voltages can be applied so as to provide multiple ion paths through which ions can travel from an inlet to an outlet of the ion guide, and one or more ion-routing devices that can be controlled, by a controller, to select from among the available propagation paths, a path along which the ions will be transmitted from the inlet to the outlet.

By way of example, and with reference to FIGS. 5A, 5B, 5C, 5D, such an ion guide 200 can include a pair of PCBs 202 and 204 between which two ion paths 206/208 are formed, as discussed in more detail below. The ion path 206 provides a substantially straight ion passageway for propagation of ions received via an inlet port 211 of the ion guide to its outlet port 213. In contrast, the ion path 208 provides a circuitous ion passageway having a plurality of segments that are disposed at acute angles relative to one another through which the received ions pass. As discussed in more detail below, in this embodiment, the two ion paths 206 and 208 share a common proximal and a common distal segment. In other embodiments, the two ion paths may share only one common segment (e.g., a common proximal segment or a common distal segment), or may not have any segments in common.

In some embodiments, such an ion guide 200 can be employed as Q2 stage of an integrated mass spectrometer, e.g., the above mass spectrometer 100 discussed above.

In this embodiment, the ion paths 206/208 share a proximal segment 210 that receives the incoming ions via the inlet port 211. The ion paths 206/208 further share a common distal segment 214 through which ions exit the ion guide via the outlet port 213. The ion path 206 also includes a central segment 215 that is not shared with the ion path 208 and connects the common proximal segment 210 to the common distal 214 segment such that a combination of the proximal segment 210, the central segment 215 and the distal segment 214 forms a substantially straight ion passageway for transmitting the received ions from the inlet port 211 to the outlet port 213.

At a junction 216 between the two ion paths, which is formed at the end of the proximal segment 210 (which is herein also referred to as a “proximal junction”), the ion paths 206 and 208 diverge such that the ion path 206 continues along a substantially straight path to the outlet 213 while the ion path 208 extends along multiple segments (208*a*, 208*b*, 208*c*, 208*d* and 208*e*) to join the common distal segment 214 at a distal junction 220. While in this embodiment the consecutive segments of the ion path 208 are substantially orthogonal to one another, in other embodiments two or more adjacent segments can form an angle other than 90 degrees relative to one another.

In this embodiment, the two ion paths share a distal segment 214 that terminates at the outlet 213 through which ions exit the ion guide.

Figure 5A:
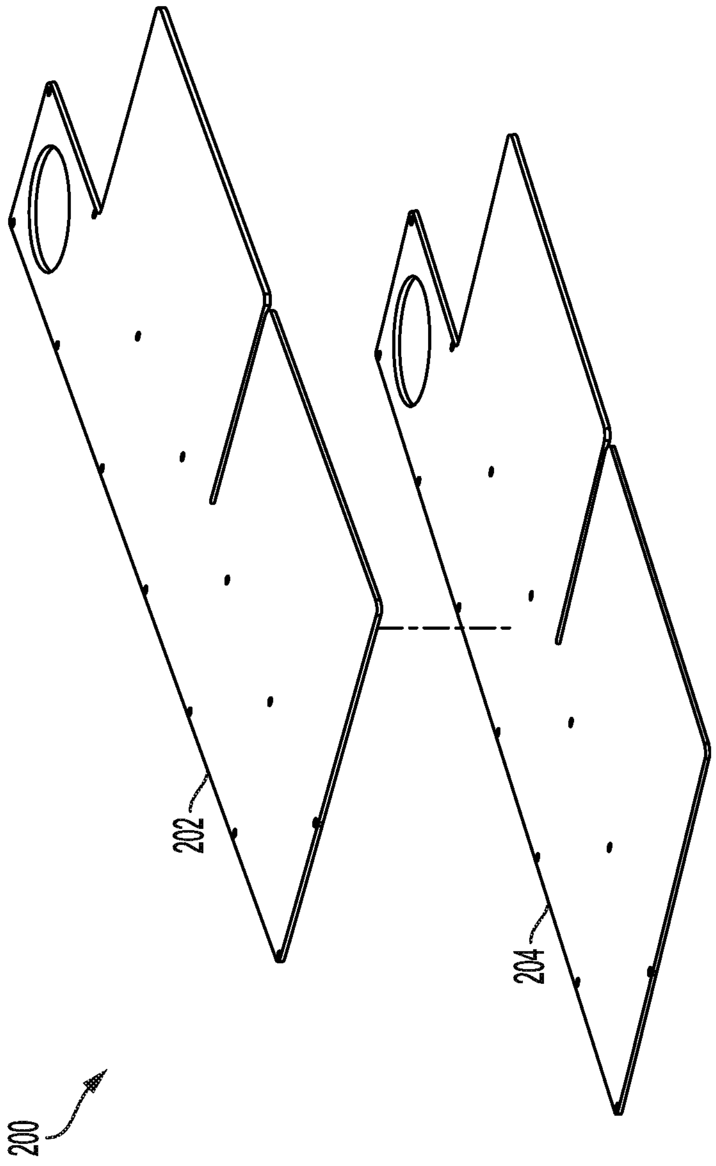
FIG. 5B is a schematic view of two ion paths provided by the ion guide formed between the PCBs depicted in FIG. 5A, where the arrows indicate one of the ion paths providing a substantially straight passageway for the propagations of the ions from the inlet port to the outlet port.
FIG. 5C is another schematic view of the two ion paths provided by the ion guide depicted in FIG. 5A, where the arrows indicate another one of the ion paths that provides a circuitous path from the inlet port to the outlet port.
FIG. 5D is a schematic view of the multi-path ion guide depicting two ion-routing devices operating under control of a controller for controlling passage of ions through the ion guide, FIG. 6 schematically depicts an example of an implementation of an ion-routing device suitable for use in the practice of the present teachings, which employs DC voltages for controlling the transmission of ions along different ion paths provided by the ion guide, FIG. 7A schematically depicts another example of an implementation of an ion-routing device suitable for use in the practice of the present teachings, which employs a quadrupolar field for controlling the transmission of ions through different ions paths provided by the multi-path ion guide.
Figure 5B:
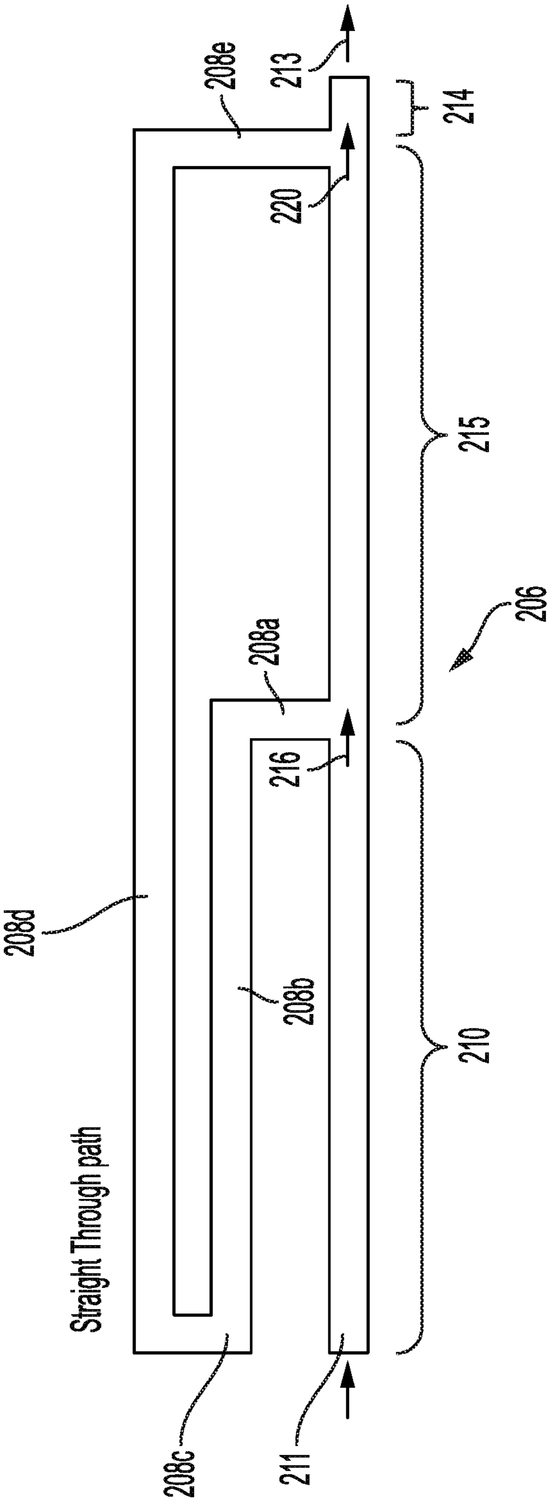
Figure 5C:
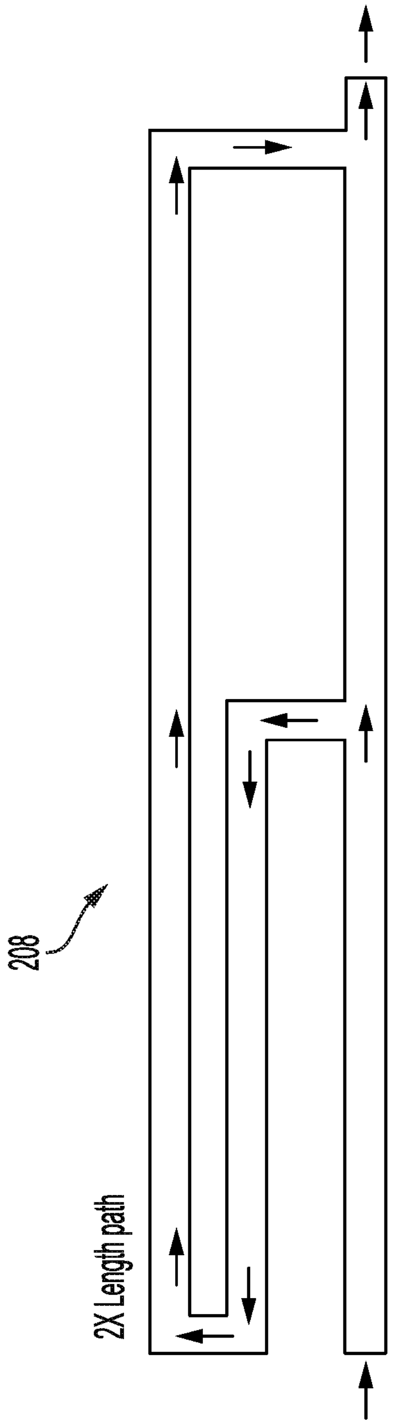
Figure 5D:
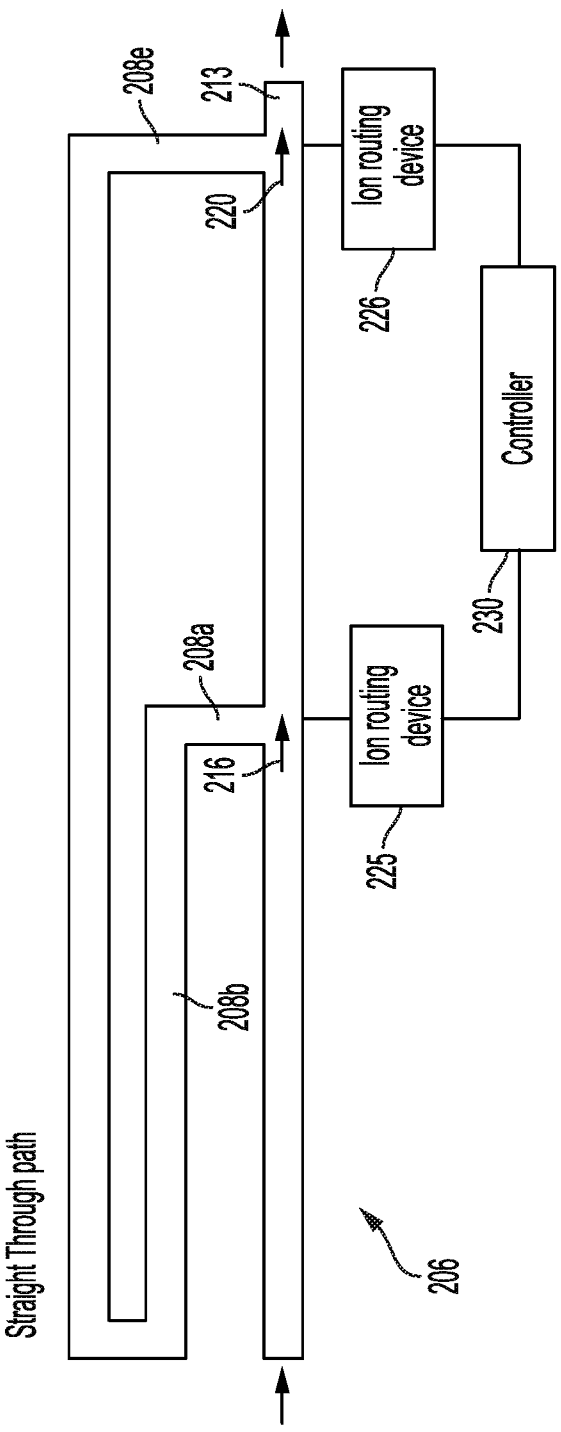

As shown schematically in FIG. 5D, two ion-routing devices 225 and 226 are coupled to the proximal and distal junctions 216 and 220 of the ion guide, respectively, and are controlled by a controller 230. For example, the controller 230 can activate the ion-routing device 225 so as to divert the ions received via the inlet 211 from the ion path 206 into the circuitous portions of the ion path 208 formed by the ion propagation segments (208*a*, 208*b*, 208*c*, 208*d*, and 208*e*). After passage through these segments, the ions reach the distal junction 220 at which the ion routing device 226 directs the ions into the common distal segment 214 through which the ions exit the ion guide.

Alternatively, the controller 230 can control the ion-routing device 225 such that the ions continue to travel along the substantially straight ion path 206 to exit the ion guide via the outlet 213.

Though not shown in FIG. 5D, similar ion-routing devices can be employed at each junction where the path of the ions is changed, e.g., junctions at the intersection of various segments of the ion path 208, to redirect the propagation path of the ions.

Figure 6:
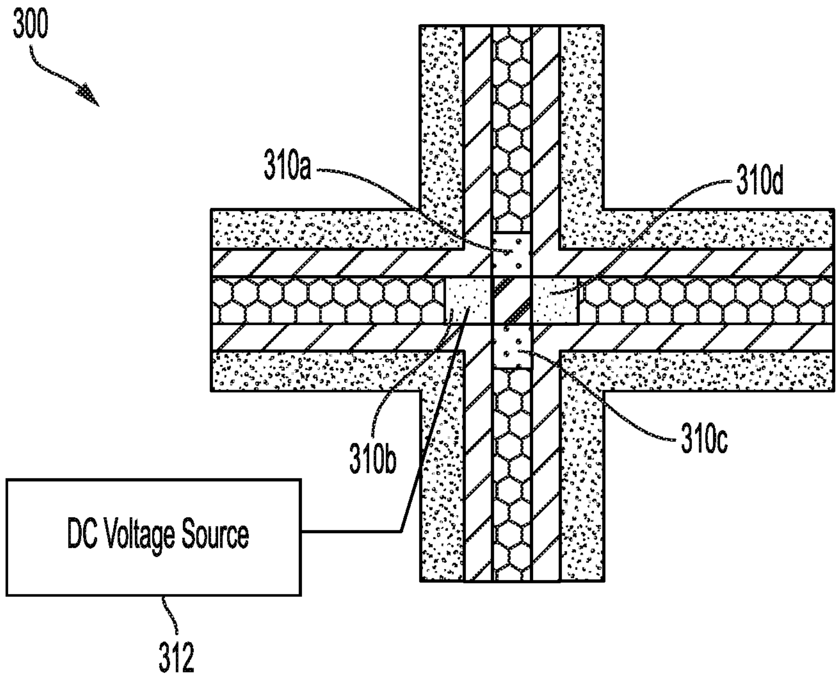

A variety of ion-routing devices can be used in the practice of the present teachings. By way of example, FIG. 6 schematically depicts an ion-routing device 300 that utilizes DC bias voltages to divert ions from one ion path to another or re-rout ions within an ion path. The ion-routing device 300 includes a plurality of conductive segments 310*a*, 310*b*, 310*c*, and 310*d* (herein collectively referred to as electrodes 310) to which DC voltages can be applied, e.g., via a DC voltage source 312 operating under the control of the controller 230. By way of example, the controller 230 can control the DC voltage source 312 to apply DC voltages with the depicted polarities to the conductive segments 310 to divert the ions propagating through the common proximal segment 210 into the segment 208*a* of the ions path 208.

Figure 7A:
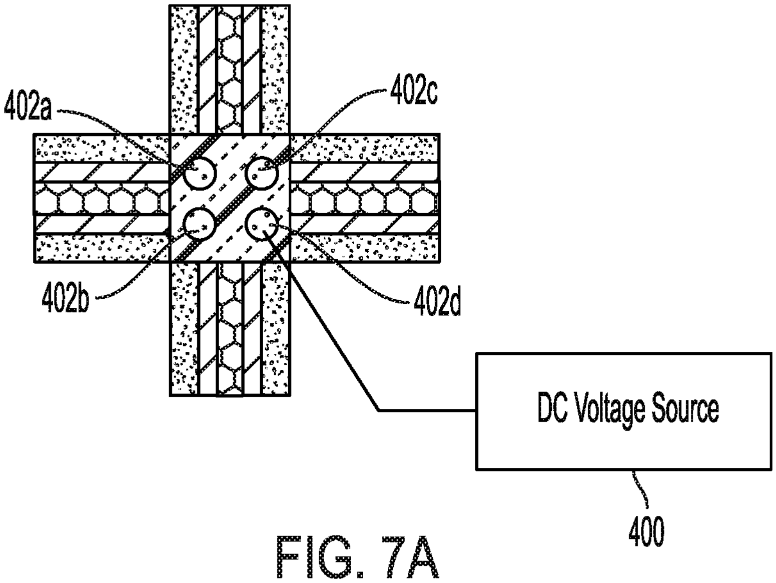
FIG. 7B is a schematic depiction of the field lines associated with the quadrupolar field generated by the ion-routing device shown in FIG. 7A, FIG. 8 schematically depicts that in some embodiments, an ion guide according to the present teachings can include one or more conductive traces formed as a plurality of conductive segments separated by insulating segments for generating an axial electric field.
Figure 7B:
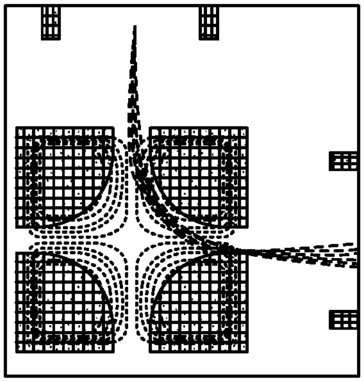

Alternatively, the ion-routing device can be implemented using quadrupolar fields. By way of example, with reference to FIG. 7A, an DC voltage source 400 operating under control of the controller 230 (not shown in this figure) can apply DC voltages to a plurality of conductive rods 402*a*, 402*b*, 402*c*, and 402*d* (herein referred to collectively as conductive rods 402) to generate a quadrupolar deflection field within a junction of two (or more) ion passageways, e.g., as shown in FIG. 7B, for routing the ions along a desired direction.

By way of example, the conductive rods can be implemented as a plurality of conductive posts that are disposed between the two PCBs forming the ion guide. In some cases, in addition to functioning as electrodes to which DC voltages can be applied, such posts can function as structural elements that help maintain the two PCBs relative to one another.

In some embodiments, the ion guide can be configured to provide axial electric fields along at least a portion of at least one of the ion paths. For example, in some such embodiments, one or more electrodes to which RF and/or DC voltages are applied for guiding the ions along one or more segments of the ion paths can be implemented as a plurality of conductive segments, where any two adjacent conductive segments are separated by an insulating segment such that a DC voltage drop between the conductive segments can generate an axial electric field for accelerating the ions along that segment.

Figure 8:
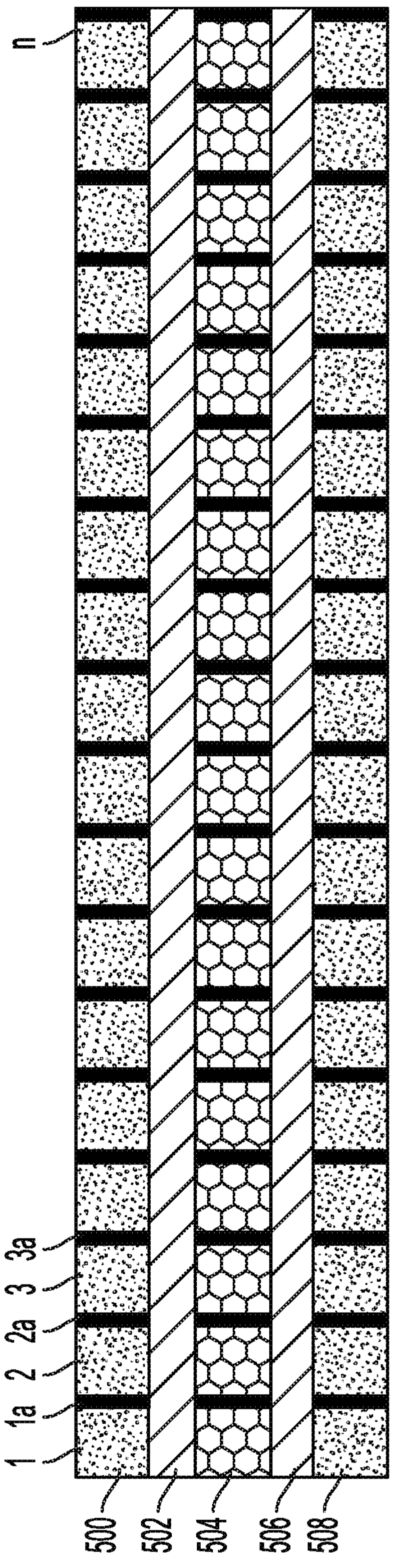

By way of example, FIG. 8 schematically depicts five conductive traces 500, 502, 504, 506, and 508, that are deposited on an inner surface of a portion of one of the PCBs forming the ion guide (e.g., the inner surface corresponding to the proximal segment 210 of the ion guide (See, e.g., FIG. 5B)). The conductive traces 502 and 506 (herein referred to as RF conductive traces) are configured for application of RF voltages thereto while the conductive traces 500, 504, and 508 (herein referred to as DC conductive traces) are configured for application of DC voltages thereto. In this embodiment, each of the DC conductive traces is formed of a plurality of electrically conductive segments that are separated from one another by insulating segments. For example, the DC conductive trace 500 is formed of a plurality of conductive segments 1, 2, 3, . . . , n, which are pairwise separated by a plurality of electrically insulating segments 1*a*, 2*a*, 3*a*, . . . , etc. In this embodiment, the other DC conductive traces 504 and 508 are also implemented in a similar manner as a plurality of electrically conductive segments separated from one another by a plurality of insulating segments.

The application of a DC voltage across each DC conductive trace can result in a series of voltage drops across each pair of the conductive segments separated by an insulating segment, thereby generating an axial electric field along the respective segment of the ion guide.

The axial electric field can facilitate the transit of the ions through the ion guide. The axial electric field can also be used to define the beam energy for introduction into the FT quadrupole mass spectrometer.

EXAMPLES

With reference to FIGS. 9A, 9B, 9C, 9D, 9E, and 9F, a prototype planar RF ion guide was fabricated in accordance with the present teachings using a pair of opposed PCBs formed of Rogers material and having a plurality of RF electrodes deposited on their inner surfaces, e.g., in a manner discussed above. The fabricated RF ion guide was incorporated in a modified Sciex 4000QTRAP mass spectrometer in place of a conventional collision cell to receive ions from upstream mass analyzer Q1. The application of RF voltages with a frequency of 0.728 MHz and an amplitude (zero-to-peak amplitude) of from 0 to 1000 volts to the conductive strips of the prototype planar RF guide provided radial confinement of ions as they passed through the planar ion guide. At least a portion of the ions received by the prototype ion guide undergoes fragmentation to generate a plurality of product ions, which are in turn were received by a downstream mass analyzer Q3.

The Q3 mass analyzer was operated as a conventional RF/DC quadrupole mass analyzer.

Figure 9C:
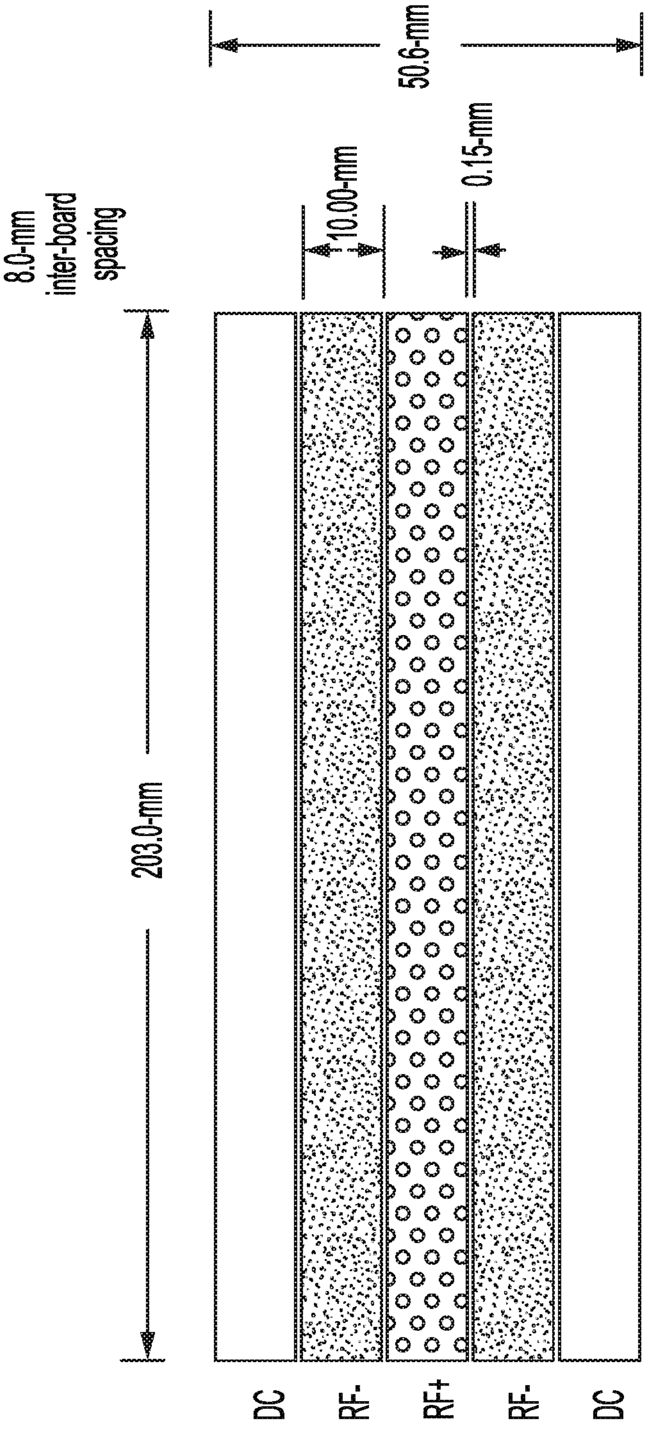
FIG. 9C shows a pattern of RF and DC voltages applied to the electrodes of an ion guide according to an embodiment.
Figure 9D:
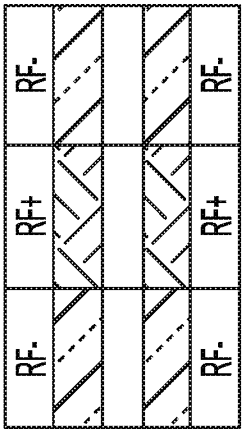
FIG. 9D shows the phases of the RF voltages shown in FIG. 9C.
Figure 9E:
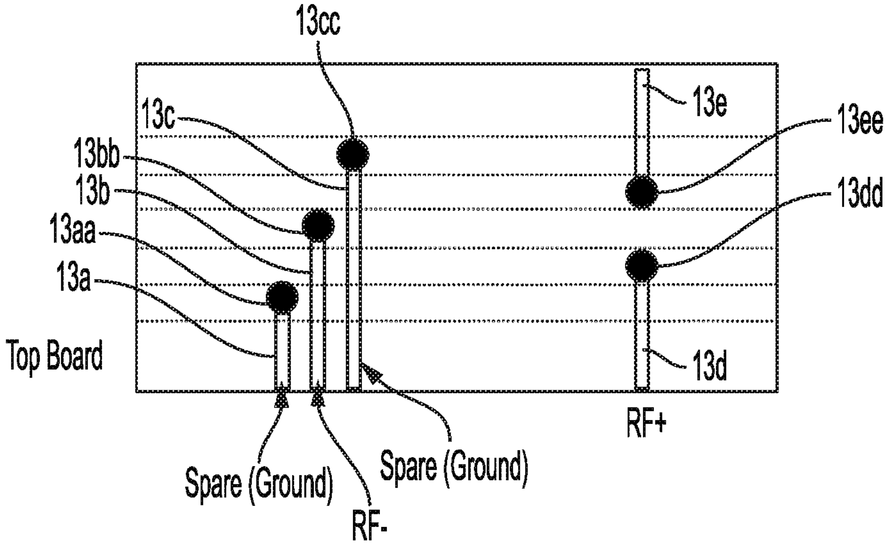
FIG. 9E shows schematically a plurality of conductive traces disposed on the top PCB of the prototype device shown in FIG. 9A for application of RF and/or DC voltages to the electrodes of the prototype devices.
Figure 9F:
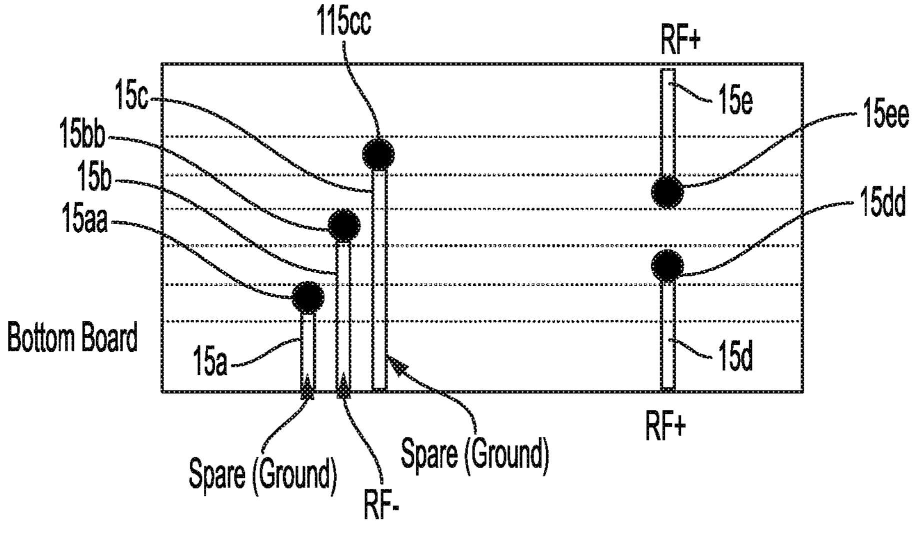
FIG. 9F shows schematically a plurality of conductive traces disposed on the bottom PCB of the prototype device shown in FIG. 9A for application of RF and/or DC voltages to the electrodes of the prototype devices.

As shown schematically in FIGS. 9E and 9F, a plurality of conductive traces 13*a*, 13*b*, 13*c*, 13*d*, and 13*e* are disposed on the top PCB 102 and another plurality of conductive traces 15*a*, 15*b*, 15*c*, 15*d*, and 15*e* are disposed on the bottom PCB to allow application of RF and/or DC voltages to the electrodes disposed on the inner surfaces of the PCBs. A plurality of metal-filled vias 13*aa*, 13*bb*, 13*cc*, 13*dd*, and 13*ee* allow transmission of RF and/or DC voltages from one side (external side) of the top PCB 102 to the opposed (inner) surface of the PCB, and another plurality of metal-filled vias 15*aa*, 15*bb*, 15*cc*, 15*dd*, and 15*ee* allow transmission of RF and/or DC voltage from one side (external side) of the bottom PCB 104 to the opposed (inner) surface of the PCB.

The ion guide was biased as shown in FIG. 9C and the Q3 mass analyzer was operated as a conventional RF/DC quadrupole mass analyzer.

Figure 10:
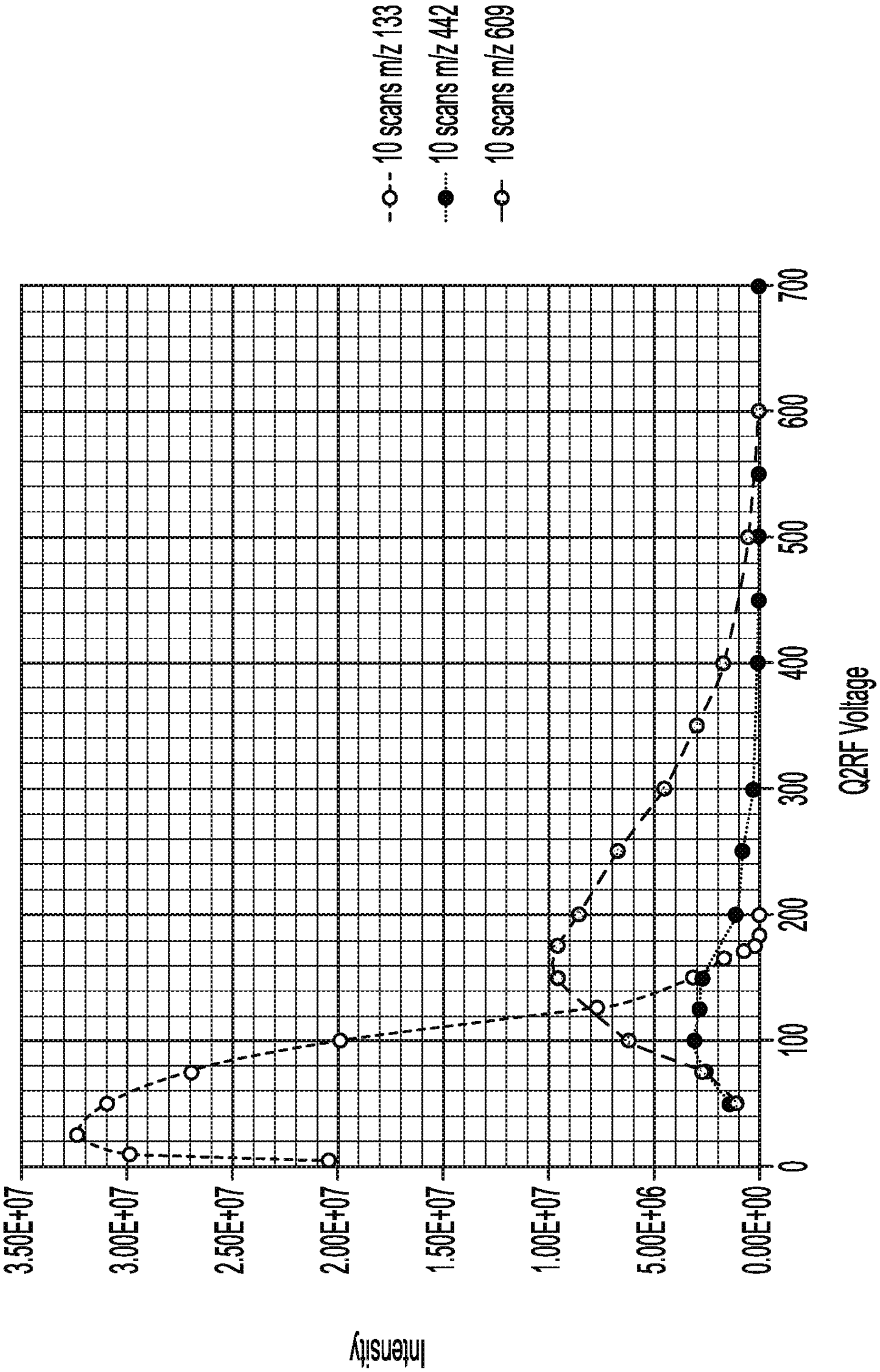
FIG. 10 presents data indicative of the transmission efficiency of the prototype ion guide.

FIG. 10 shows the transmission efficiency of the ion guide as a function of RF voltage for three different ions.

Those having ordinary skill in the art will appreciate that various changes can be made to the above embodiments without departing from the scope of the present teachings.

What is claimed is:

1. An ion guide for use in a mass spectrometer, comprising:

an inlet for receiving a plurality of ions from an upstream ion source and an outlet through which ions can exit the ion guide, at least two ion paths extending from said inlet to said outlet, wherein said at least two ion paths have a common proximal segment for receiving ions from said inlet and a common distal segment through which the ions exit through said outlet, an ion routing device coupled to said at least two ion paths for establishing a propagation path of said ions along a first or second ion path, among said at least two ion paths, from said inlet to said outlet, two substantially flat surfaces between which said first and second ion paths are formed, and a plurality of ion-guiding conductive electrodes disposed on said two surfaces and configured for application of RF and/or DC voltages thereto for guiding the ions along said first and second ion paths, wherein said ion routing device comprises a plurality of conductive posts disposed between said two surfaces to which one or more RF and/or DC voltages can be applied for generating a field for diverting ions from one of said first and second ion paths to the other of said first and second ion paths.

2. The ion guide of claim 1, further comprising a controller for providing one or more control signals to said ion routing device for selecting said first or said second ion path for propagation of the ions from said inlet to said outlet.

3. The ion guide of claim 1, wherein each conductive electrode on each of said two surfaces is in substantial register with a conductive electrode on the opposed surface so as to provide one or more pairs of opposed conductive electrodes, wherein across each pair of said opposed conductive electrodes one or more RF and/or a DC voltages can be applied.

4. The ion guide of claim 1, further comprising an RF source and a DC source for applying said RF and/or DC voltages to said conductive posts.

5. The ion guide of claim 4, wherein said controller is in communication with said RF and DC voltage source for controlling application of said RF and/or DC voltages to said posts.

6. The ion guide of claim 1, further comprising an RF source and a DC source for applying said RF and/or DC voltages to said ion-routing electrodes.

7. The ion guide of claim 6, wherein said controller is in communication with said RF and DC voltage source for controlling application of said RF and/or DC voltages to said electrodes.

8. The ion guide of claim 1, wherein said first and second ion paths have different lengths.

9. The ion guide of claim 1, wherein said two surfaces comprise two opposed surfaces of two printed circuit boards (PCBs).

10. The ion guide of claim 1, wherein at least one of said first and second ion paths provides a serpentine ion propagation path.

11. An ion guide for use in a mass spectrometer, comprising:

two printed circuit boards (PCBs) positioned relative to one another such that two surfaces of the PCBs are opposed relative to one another and are separated by a gap providing an ion transmission passageway between said two surfaces, wherein said passageway comprises an inlet for receiving ions and an outlet through which ions exit the passageway, a plurality of ion guiding electrodes disposed on said surfaces to which RF and/or DC voltages can be applied for guiding the ions from said inlet to said outlet, wherein said plurality of electrodes are arranged on said surfaces so as to provide first and second ion paths for transmission of the ions from said inlet to said outlet, and an ion routing device for establishing a propagation path for the ions received from said inlet to said outlet along said first or said second ion path, wherein said ion routing device comprises a plurality of electrically conductive posts disposed between said opposed surfaces to which RF and/or DC voltages can be applied for diverting the ions from one of said first and second ion paths to the other of said first and second ion paths.

12. The ion guide of claim 11, wherein said plurality of posts are configured to provide structural support for maintaining the separation between said two printed circuit boards.

13. The ion guide of claim 11, further comprising a controller in communication with said ion routing device for applying control signals thereto such that said ion routing device selects one of said first and second ion paths for transmission of the ions from said inlet to said outlet.

14. The ion guide of claim 11, wherein said first and second ion paths have at least one segment in common.

* * * * *